United States Patent [19]

Bierbrauer et al.

[11] Patent Number: 4,522,246
[45] Date of Patent: Jun. 11, 1985

[54] PROTECTIVE COVER FOR A MACHINE BED

[75] Inventors: Heiner Bierbrauer; Wolfgang Diels, both of Munich, Fed. Rep. of Germany

[73] Assignee: Gebr. Hennig GmbH, Fed. Rep. of Germany

[21] Appl. No.: 510,416

[22] Filed: Jul. 1, 1983

Related U.S. Application Data

[63] Continuation of Ser. No. 192,448, Sep. 30, 1980.

[30] Foreign Application Priority Data

Oct. 10, 1979 [DE] Fed. Rep. of Germany ....... 2941126

[51] Int. Cl.$^3$ ................................................ E06B 3/32
[52] U.S. Cl. ..................................... 160/223; 308/3.5
[58] Field of Search .................. 308/3.5; 160/223, 202

[56] References Cited

U.S. PATENT DOCUMENTS

| 1,279,952 | 9/1918 | White ...................................... 38/138 |
| 3,578,061 | 5/1971 | Hascheck ............................ 160/223 |

FOREIGN PATENT DOCUMENTS

| 538016 | 5/1955 | Belgium ............................. 160/202 |
| 1050148 | 2/1959 | Fed. Rep. of Germany ....... 308/3.5 |
| 1602806 | 5/1970 | Fed. Rep. of Germany ....... 308/3.5 |

Primary Examiner—Peter M. Caun
Assistant Examiner—Cherney S. Lieberman
Attorney, Agent, or Firm—Learman & McCulloch

[57] ABSTRACT

A protective cover for a machine bed comprises a plurality of cover boxes telescopically slidable relative to one another and a locking mechanism comprising two pawls by means of which the smallest cover box may be locked to the end of the machine bed or to the largest cover box. The locking mechanism is distinguished by a simple structure and lightness in weight and may be retrofitted to already existing covers.

14 Claims, 6 Drawing Figures

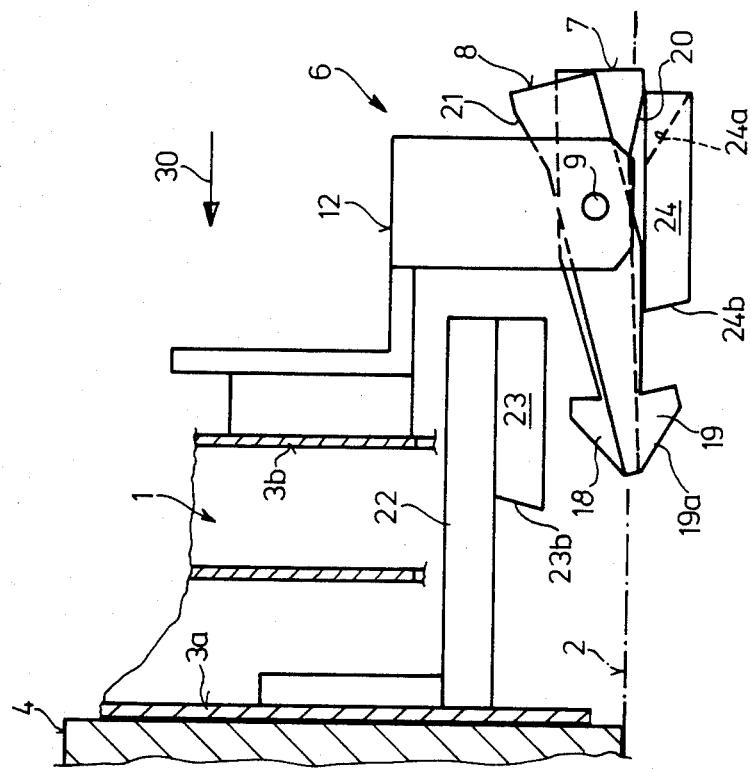
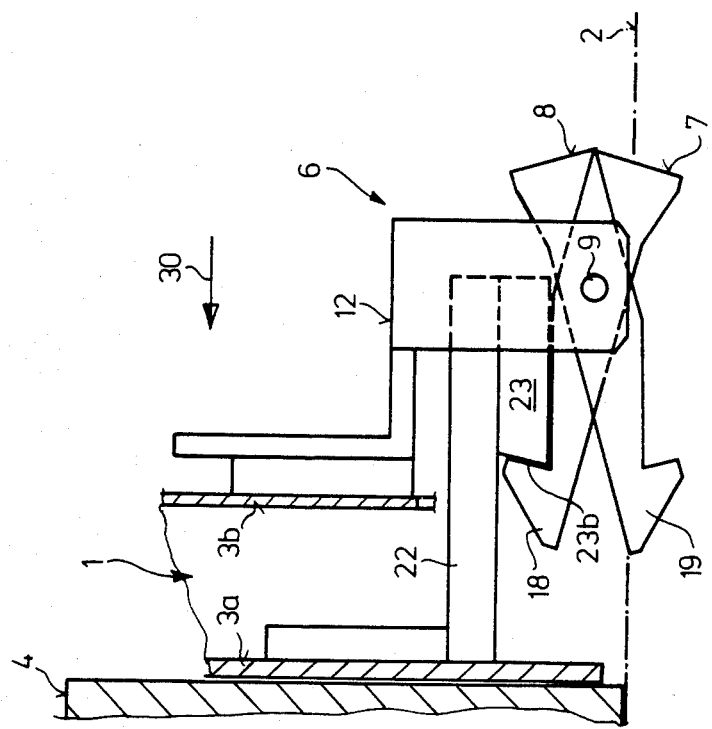

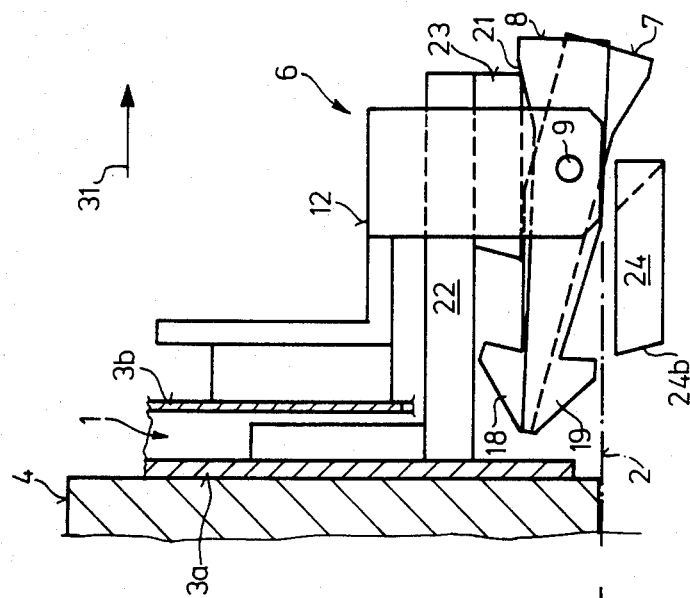
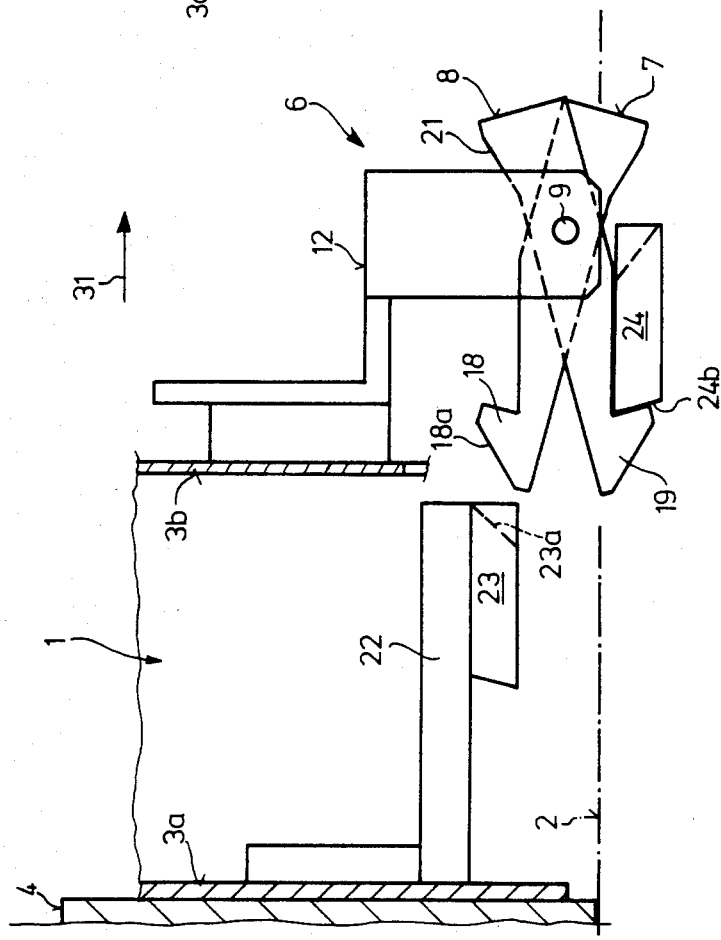

PROTECTIVE COVER FOR A MACHINE BED

RELATED APPLICATION

This application is a continuation of U.S. application Ser. No. 192,448, filed Sept. 30, 1980.

BACKGROUND OF THE INVENTION

This invention relates to a cover intended for the protection of a machine bed and consisting of a plurality of cover boxes slidable telescopically into one another, of which the largest cover box is fixedly connected to a part of the machine displaceable on the machine bed, while the smallest cover box carries a locking mechanism by which the smallest cover box may be locked to the end of the machine bed or to the largest cover box.

Covers of the type mentioned above are used for example in machine tools in order to be able to utilize the entire length of a machine's bed for the moving part of the machine (for example its carriage). In one known construction of the type in question (DE-OS No. 16 02 806), the locking mechanism comprises a reversible two-armed lever which is carried by the outer end wall of the smallest cover box. One arm of this lever cooperates with a control surface and with a pair of stops which are carried by the machine carriage or by the largest cover box via an extension projecting into the vicinity of the abovementioned outer end wall, while the other arm of the lever cooperates with another control surface and with another pair of stops which are positioned at the end of the machine bed.

SUMMARY OF THE INVENTION

In practice, it has been found to be desirable further to improve a cover of the type in question in such a way that, in particular, the locking mechanism provided thereon is structurally simpler and lighter in weight and may even be retrofitted to existing covers.

According to the invention, this object is achieved in that the locking mechanism comprises two independently pivotable, spring biased pawls which are designed to be actuated by a control surface fixedly arranged on the end of the machine bed in such a way that the smallest cover box may be locked to the end of the machine bed by one of the pawls and to the largest cover by the other pawl.

The pawls of the locking mechanism constructed and arranged in accordance with the invention ensure particularly reliably that, on the one hand, the smallest cover box is held in place at the end of the machine bed when the telescopic cover is extended without preventing the other cover boxes from moving further apart from one another while, on the other hand, enabling the individual cover boxes to be fitted extremely compactly into one another so that the entire, telescopically closed cover may be moved with the displaceable part of the machine beyond the end of the machine bed without the machine bed's having to be lengthened accordingly. The cover thus telescopically closed may be carried substantially independently by the moving part of the machine to which the entire cover is fixed solely, for example, through the largest cover box (or rather a wall section thereof). The pawls provided may be of extremely simple design and cooperate with control surfaces of equally simple design. This locking mechanism has the further advantage that it may be made relatively light in weight and, hence, does not overburden the cover itself. Finally, another advantage lies in the fact that the locking mechanism subsequently may be fitted to already existing covers.

In one advantageous embodiment of the invention, the two pawls are mounted at an interval from one another on a common horizontal spindle carried via a holder by the smallest cover box.

In this connection, it is extremely favorable for a torsion spring biasing the two pawls in opposite directions to be arranged on the horizontal spindle between these two pawls and for limiting stops for the biasing movement to be associated with each pawl. In this way, the spring force required for the pivotability of the two pawls may be provided by a single torsion spring which may be simply and compactly arranged.

In another advantageous embodiment of the invention, each locking pawl is in the form of a double lever arm and is provided at the end facing the largest cover box with a snap-in projection and, at the opposite end, with a control surface, the snap-in projection and the control surface being respectively arranged on opposite longitudinal sides of the associated pawl. Locking pawls designed in this way may be produced and assembled very easily.

In this connection, it is also of advantage for the largest cover box to carry, via a holding arm projecting towards the smallest cover box, a first snap-in plate which cooperates on the one hand with the upwardly projecting snap-in projection of the first pawl and, on the other hand, with the upwardly facing control surface of the second pawl, while a second, lower snap-in plate carrying the fixed control surface is present for fixing to the machine bed, cooperating on the one hand with the downwardly projecting snap-in projection of the second pawl and, on the other hand, with the downwardly facing control surface of the first pawl.

To ensure that the smallest cover box always covers the end of the machine bed in a particularly reliable manner, even during extension and in the extended position of the cover, that end of the smallest cover box which faces away from the largest cover box is provided in accordance with the invention with a front end wall which projects downwards beyond the level of the top edge of the machine bed and, with this section, forms a stop for limiting the movement of this cover box in the direction of the moving part of the machine.

In this connection, it is of particular advantage for the front end wall of the smallest cover box to be provided on its inside with a supporting element which is designed to rest on the upper side of the machine bed and which comprises an approach ramp directed towards the moving part of the machine. In this way, that end of the smallest cover box which is situated near the end of the machine bed is unable to dip downwards so that, even when it is extended, the cover is adequately supported.

DESCRIPTION OF THE DRAWINGS

An exemplary embodiment of the invention is described in detail in the following specification with reference to the accompanying, largely diagrammatic drawings, wherein:

FIGS. 3 to 6 are partial longitudinal elevations of the cover in four different working positions.

DETAILED DESCRIPTION

Figure 1:
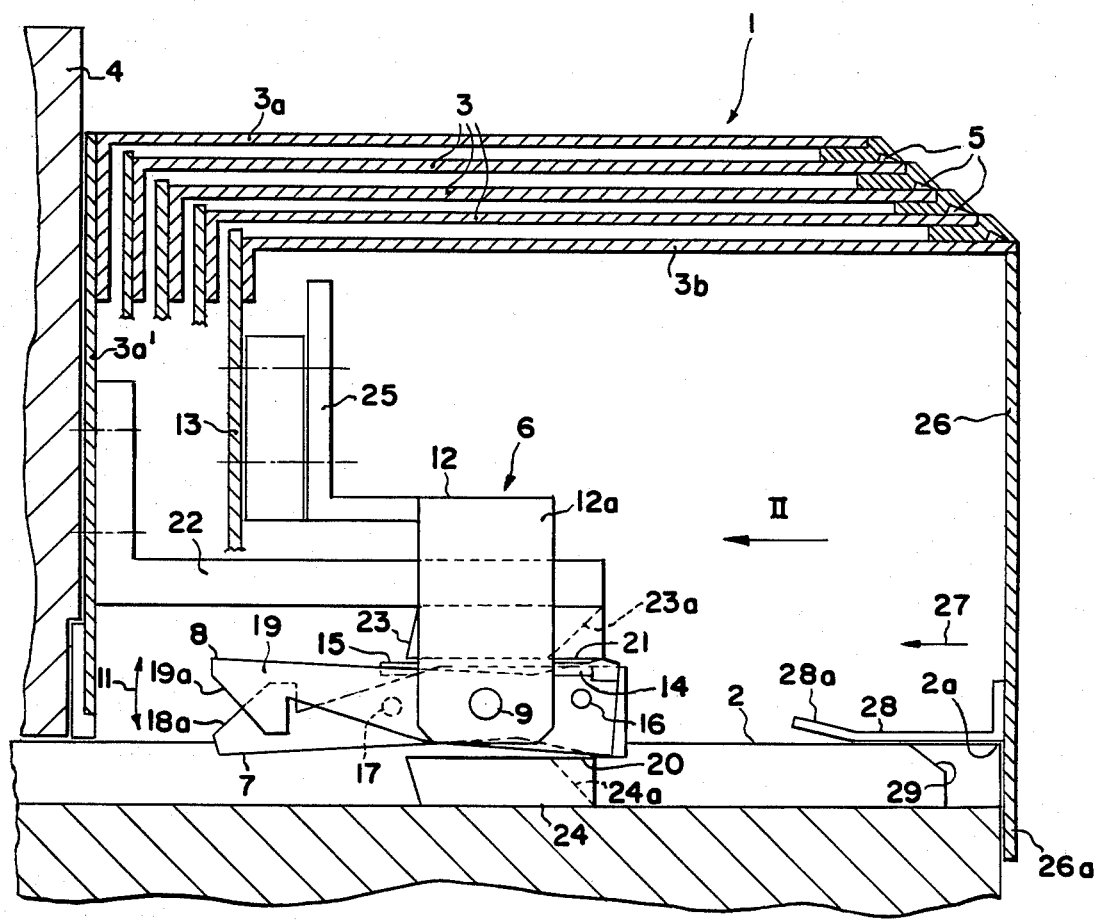
FIG. 1 is a longitudinal section through the cover according to the invention.

FIG. 1 shows the overall structure of the cover 1 which is intended for the protection of a machine bed represented by the dash-dot line, particularly the bed 2 of a machine tool, the dash-dot line representing the upper side of the machine bed 2.

The cover 1 comprises any selected number, depending upon the particular application, of cover boxes 3 telescopically slidable into one another of which the largest cover box is fixedly connected through its rear wall 3a' to the moving part 4 of the machine (shown in part only) which may be formed by the carriage or table displaceable on the machine bed. At their ends facing away from the moving part 4 of the machine, the individual cover boxes 3 have cup-like slides 5 which provide support for the front ends of the boxes.

Figure 2:
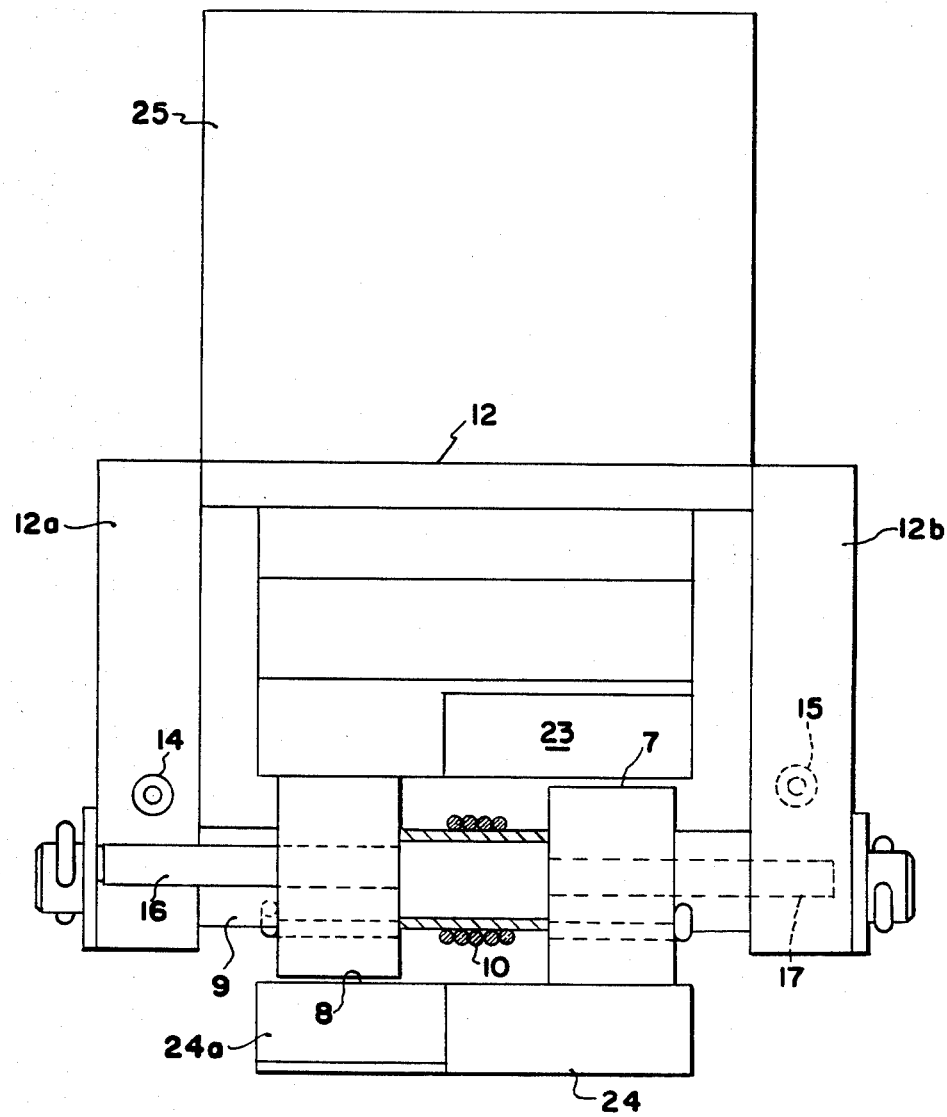
FIG. 2 is a front elevation of the locking mechanism as viewed in the direction of the arrow II in FIG. 1, but illustrating the locking mechanism in adjusted position.

The smallest cover box 3b of the cover 1 carries a locking mechanism 6. This locking mechanism comprises (see FIG. 2) two side-by-side latching or locking pawls, namely the first pawl 7 and the second pawl 8. Both pawls 7, 8 are mounted at an interval from one another on a common horizontal spindle 9 in such a way that they may be pivoted independently of one another. A torsion spring 10 is arranged between the two pawls 7, 8 on the horizontal spindle 9 and is connected to them in such a way that they are biased in opposite directions (see the two-headed arrow 11 in FIG. 1).

The horizontal spindle 9 is carried by a holder in the form of a U-shaped retaining yoke 12 which in turn is carried by that rear wall 13 of the smallest cover box 3b which faces towards the largest cover box 3a and the moving part 4 of the machine. The U-shaped retaining yoke 12 extends over the two pawls 7, 8 and the torsion spring 10 while the ends of the horizontal spindle 9 are mounted and held accordingly in the U-arms 12a, 12b of the retaining yoke 12.

In addition, stop pins 14 and 15 are fixed in the manner indicated in these U-arms 12a, 12b of the retaining yoke 12, cooperating with stop elements, preferably again formed by stop pins or the like 16 and 17 which are fixed to the pawls 7, 8. These stop elements 14 to 17 limit the biasing movement of the two pawls 7, 8 by the torsion spring 10.

As can be seen from FIGS. 1, 3, and 5, in particular, the locking pawls 7, 8 are each in the form of a double lever arm and are each provided with snap-in projections 18, 19 at their ends facing towards the largest cover box 3a and with contoured control surfaces 20, 21 at their opposite ends. FIG. 1 also shows that the snap-in projections 18, 19 and the control surfaces 20, 21 are respectively provided on opposite longitudinal sides (upper and lower sides) of the associated pawls 7 and 8.

On a holding arm 22 projecting towards the smallest cover box 3b, the largest cover box 3a carries a first retainer or snap-in plate 23 which cooperates on the one hand with the upwardly directed snap-in projection 18 of the first pawl 7 and, on the other hand, with the downwardly inclined control surface 21 of the second pawl 8. In addition, a second lower (see for example FIG. 1) retainer or snap-in plate 24 forming a fixed control surface is present for fixing to the machine bed 2. This second snap-in plate cooperates on the one hand with the downwardly directed snap-in projection 19 of the second pawl 8 and, on the other hand, with the downwardly directed control surface 20 of the first pawl 7. As can be seen from the drawing, this second snap-in plate 24 is situated at the end of the machine bed 2, but at a distance from the end edge 2a of the machine bed in adaptation to the position of the pawls 7, 8 pivotally mounted on the retaining yoke 12. In this way, the two pivotal pawls 7, 8 can be actuated by the control surface of this snap-in plate 24 in such a way that the smallest cover box 3b may be locked to the end of the machine bed 2 by the second pawl 8 and to the largest cover box 3a by the first pawl 7, as will be explained in more detail hereinafter with reference to FIGS. 3 to 6.

So far as the configuration of the two pawls 7, 8 is concerned, it is further pointed out that, at their ends facing towards the associated snap-in plates 23 and 24, the snap-in projections 18, 19 of the two pawls 7 and 8 also comprise control surfaces which cooperate with the snap-in plates and which, in this case, are in the form of sloping surfaces 18a and 19a to ensure that, during the corresponding movement of the cover (with the moving part of the machine), these control surfaces may be brought more easily into control engagement with the ends of the snap-in plates 23, 24 facing towards the end edge 2a of the machine bed. To this end, corresponding oblique control surfaces 23a and 24a may be machined into the snap-in plates 23 and 24, as shown in dash-dot lines in FIG. 1.

The holding arm 22 for the first snap-in plate 23, together with the rear wall 3a' of the largest cover box 3a, may be fixed to the moving part 4 of the machine in any suitable manner (for example by screws). In any event, the length of this holding arm 22 is selected so that, when the cover 1 is fully retracted (as shown in FIG. 1), that end of the holding arm 22 which faces towards the end edge 2a of the machine bed and hence the first snap-in plate 23 carried by that end can be moved into the region between the U-arms 12a, 12b of the retaining yoke 12. To prevent the holding arm 22 from having to be made too long, the retaining yoke 12 is best fixed as close as possible to the rear wall 13 of the smallest cover box 3b, for example through an angular holder 25 as shown in FIG. 1.

It can also be seen from FIG. 1 that that end of the smallest cover box 3b which faces away from the largest cover box 3a comprises a front end wall 26. This end wall 26 is extended downwards beyond the level of the upper edge of the machine bed 2 to such an extent that its lower end section 26a forms a stop for limiting the movement of this cover box 3b in the direction of the moving part 4 of the machine, i.e. in the direction of the arrow 27 in FIG. 1. The cooperating stop is formed by the end edge 2a of the machine bed 2. In addition, a support element in the form of an angular support 28 is fixed to the inside of the front end wall 26. This angular support 28 may rest on the upper side of the machine bed 2 when the cover 1 is situated with its smallest cover box 3b over the machine bed 2. To ensure that the angular support 28 may also pass reliably onto the upper side of the machine bed when the cover 1 is moved from its self-supporting position (imagined to be on the extreme right of FIG. 1) in the direction of the arrow 27, that end 28a of the angular support which faces towards the moving part 4 of the machine is bent obliquely upwards so as to form an approach ramp. A complementary approach ramp 29 may be formed in the region of the end edge 2a of the machine bed, as shown in dash-dot lines in FIG. 1.

The mode of operation of the locking mechanism 6 provided in the cover described above is explained in the following with reference to FIGS. 3 to 6 which illustrate, largely diagrammatically, only those parts which are necessary to the explanation of the mode of operation of the locking mechanism.

It will be assumed first of all that the cover is illustrated in FIGS. 3 and 4 is to be moved from a position shown in FIG. 3 in which it extends beyond the end of the machine bed (i.e., from the right in the drawing) back over the machine bed 2 and to be opened out there. Accordingly, the cover initially moves completely retracted, together with the moving part 4 of the machine, in the direction of the arrow 30 (i.e., to the left in the drawing). In FIG. 3, the completely retracted cover 1 is locked by bringing the first locking pawl 7 into locking engagement through its snap-in projection 18 with the snap-in surface 23b of the first snap-in plate 23 (under the spring force exerted by the torsion spring 10). In this way, the smallest cover box 3b is locked to the largest cover box 3a through the retaining yoke 12, the pawl 7, the snap-in plate 23 and the holding arm 22. Accordingly, the entire cover 1 moves in the direction of the arrow 30.

In the locked position shown in FIG. 3, the cover 1 (together with the moving part 4 of the machine) moves in the direction of the arrow 30 until it enters into the vicinity of the fixed control surface, i.e. the second snap-in plate 24. In this position, the frontwardly facing snap-in projection 19 of the second pawl 8 (in the direction of movement of the arrow 30) runs over the second snap-in plate 24, by cooperation of the sloping surface 19a with the sloping control surface 24a, so that the snap-in projection 19 passes in front of the snap-in surface 24b of the snap-in plate 24 facing in the direction of the arrow 30. At the same time, however, the control surface 20 of the first pawl 7, which faces obliquely downwards, comes into engagement with the rear edge (looking in the direction of the arrow 30) of the snap-in plate 24 so that this first pawl 7 is rotated about the spindle 9 (against the force of the torsion spring 10) in such a way that its snap-in projection 18 is disengaged from the snap-in surface 23b of the first snap-in plate 23. Accordingly, the locking engagement between the smallest cover box 3b and the largest cover box 3a is released and, with the exception of the smallest cover box 3b, all the remaining cover boxes of the cover 1 may be moved further, together with the moving part 4 of the machine, in the direction of the arrow 30 and hence extended or opened out, while the smallest cover box 3b is held in the position shown in FIG. 1 by the application of the lower end section 26a to the end edge 2a of the machine bed.

FIGS. 5 and 6 show an opposite movement to FIGS. 3 and 4, i.e. the cover boxes of the cover 1 are moved in the direction of the arrow 31 and retracted into one another so that the moving part 4 of the machine may be moved up to the outer end of the machine bed 2.

When the cover boxes of the cover 1 begin to be retracted into one another (movement in the direction of the arrow 31), the smallest cover box is also moved to begin with until the snap-in projection 19 of the second locking pawl 8 comes into engagement with the facing snap-in surface 24b of the snap-in plate 24 so that the smallest cover box 3b is locked to the machine bed 2. This lock is maintained until all the cover boxes have been pushed into one another. At this moment, the first snap-in plate 23 carried by the holding arm 22 of the largest cover box 3a enters into the vicinity of the smallest cover box 3b and hence the locking pawls 7, 8. When the snap-in plate 23 comes into engagement with the snap-in projection 18 of the first pawl 7 (engagement of the mutually facing sloping control surfaces 23a and 18a), the lever arm of the pawl 7 which carries the snap-in projection 18 is pressed downwards against the force of the torsion spring 10 so that the snap-in plate 23 is able to run over the snap-in projection 18. As the snap-in plate 23 continues to move in the direction of the inclined arrow 31, it comes into engagement with the control surface 21 of the second pawl 8 so that this second pawl 8 is also turned against the force of the torsion spring 10 with the result that the snap-in projection 19 is pivoted upwards and is thus disengaged from the snap-in plate 24. In this position, the locking engagement between the smallest cover box 3b and the machine bed 2 is released so that, as the moving part 4 of the machine continues its movement, the cover 1 may be moved in the direction of the arrow 31 beyond the end (end edge 2a) of the machine bed 2. Since the cover boxes of the cover 1 are pushed completely into one another in the manner indicated in FIG. 6 and are safely held in this position, the cover 1 is reliably self-supporting, i.e. there is no need for any supports. When the moving part of the machine is moved back, the movements described with reference to FIGS. 3 and 4 are repeated.

While one example of the invention has been described in detail, it will be apparent to those skilled in the art that the example described may be modified. Therefore, the foregoing description is to be considered exemplary rather than limiting, and the true scope of the invention is that defined in the following claims.

What is claimed is:

1. In a protective cover construction for a bed of a machine tool having a part displaceable relative to the bed, said cover comprising a relatively large, a relatively small, and at least one intermediate size telescoping cover boxes overlying said bed; means securing the largest of said cover boxes to said machine part for movement therewith; and a locking mechanism operable selectively to enable and disable relative telescoping movement of said cover boxes, the improvement wherein said locking mechanism comprises a pair of pivotal, independent latching pawls carried by the smallest of said cover boxes, first retainer means fixed on said bed for latching engagement with one of said pawls to limit movement of the smallest cover box in one direction relative to said bed, and second retainer means carried by said largest box for latching engagement with the other of said pawls to couple the smallest and largest cover boxes together and prevent relative telescoping movement thereof, the arrangement being such that at any time at least one of said latching pawls is in engagement with its associated retainer means.

2. A construction according to claim 1 including biasing means acting on said latching pawls and yieldably urging them to latching engagement with their respective retainer means.

3. A construction according to claim 2 wherein said biasing means comprises a torsion spring and has its opposite ends connected to said pawls and biasing said pawls in opposite directions.

4. A construction according to claim 3 including means for limiting movement of said pawls by said torsion spring.

5. A construction according to claim 1 wherein said latching pawls are mounted on a common spindle carried by a holder mounted on the smallest box.

6. A construction according to claim 5 wherein said holder comprises a U-shaped yoke overlying said pawls.

7. A construction according to claim 6 wherein said smallest box has an inner wall and said yoke is fixed to said inner wall.

8. A construction according to claim 1 wherein said latching pawls are parallel to one another with corresponding ends facing said machine part, each of said pawls having a projection at that end facing said machine part and a contoured control surface at its opposite end, the projection and control surface of each pawl being arranged on opposite sides.

9. A construction according to claim 8 wherein the projections and control surfaces of said pawls face in opposite directions.

10. A construction according to claim 9 wherein each of said retainer means is engageable with the projection of one of said pawls and the control surface of the other of said pawls.

11. A construction according to claim 10 wherein each of said retainer means has a control surface engageable with the control surface of one of said pawls.

12. A construction according to claim 1 wherein said smallest cover box has an outer wall extending downwardly beyond the level of the upper surface of said machine bed to provide a stop for limiting movement of said smallest box in the one direction of movement of said machine part.

13. A construction according to claim 12 wherein said outer wall carries on its inner surface a supporting member engageable with said machine bed.

14. A construction according to claim 13 wherein said supporting member has a portion thereof inclined to form a ramp surface.

* * * * *